(12) United States Patent
Zhu et al.

(10) Patent No.: US 9,454,318 B2
(45) Date of Patent: *Sep. 27, 2016

(54) EFFICIENT DATA STORAGE SYSTEM

(71) Applicant: EMC Corporation, Hopkinton, MA (US)

(72) Inventors: Ming Benjamin Zhu, Austin, TX (US); R. Hugo Patterson, Los Altos, CA (US); Kai Li, Seattle, WA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/734,920

(22) Filed: Jun. 9, 2015

(65) Prior Publication Data
US 2016/0034212 A1 Feb. 4, 2016

Related U.S. Application Data

(60) Continuation of application No. 14/068,415, filed on Oct. 31, 2013, now Pat. No. 9,081,728, which is a continuation of application No. 13/592,746, filed on Aug. 23, 2012, now Pat. No. 8,612,696, which is a continuation of application No. 12/819,356, filed on Jun. 21, 2010, now Pat. No. 8,275,955, which is a continuation of application No. 12/079,766, filed on Mar. 28, 2008, now Pat. No. 7,769,967, which is a division of application No. 11/136,263, filed on May 24, 2005, now Pat. No. 7,373,464, which is a continuation of application No. 10/325,690, filed on Dec. 20, 2002, now Pat. No. 6,928,526.

(51) Int. Cl.
*G06F 12/00* (2006.01)
*G06F 3/06* (2006.01)
*G06F 11/14* (2006.01)

(52) U.S. Cl.
CPC ............ *G06F 3/0619* (2013.01); *G06F 3/064* (2013.01); *G06F 3/065* (2013.01); *G06F 3/0608* (2013.01); *G06F 3/0641* (2013.01); *G06F 3/0683* (2013.01); *G06F 3/0689* (2013.01); *G06F 11/1435* (2013.01); *G06F 11/1453* (2013.01); *G06F 11/1464* (2013.01)

(58) Field of Classification Search
CPC .... G06F 12/00; G06F 12/08; G06F 12/0811; G06F 11/1446; G06F 11/1448; G06F 11/1458; G06F 3/0619; G06F 3/064
USPC .................. 711/100, 118, 154, 156, 161, 162
See application file for complete search history.

(56) References Cited

U.S. PATENT DOCUMENTS 6,157,986 A * 12/2000 Witt ..................... G06F 12/1045
711/118

* cited by examiner

*Primary Examiner* — Tuan Thai
(74) *Attorney, Agent, or Firm* — Blakely, Sokoloff, Taylor & Zafman LLP

(57) ABSTRACT

A system and method are disclosed for providing efficient data storage. A plurality of data segments is received in a data stream. The system determines whether a data segment has been stored previously in a low latency memory. In the event that the data segment is determined to have been stored previously, an identifier for the previously stored data segment is returned.

17 Claims, 7 Drawing Sheets

| 0 | 0 | 0 | 0 | 0 | --- | 0 | 0 | 0 | 0 | --- |

FIG. 6A

| 0 | 0 | --- | 0 | / | 0 | --- | 0 | / | 0 | --- | 0 | / | 0 | --- |

With labels $P_1$, $P_2$, $P_3$ above.

FIG. 6B

| 0 | 0 | / | 0 | --- | 0 | / | 0 | / | --- | / | | 0 | / | 0 | --- |

With labels $P'_1$, $P_1,P'_2$, $P'_3$, $P_2$, $P_3$ above and $q_1$, $q_2$, $q_3$ below.

FIG. 6C

EFFICIENT DATA STORAGE SYSTEM

CROSS REFERENCE TO OTHER APPLICATIONS

This application is a continuation of U.S. patent application Ser. No. 14/068,415 entitled EFFICIENT DATA STORAGE SYSTEM filed Oct. 31, 2013, which is incorporated herein by reference for all purposes, which is a continuation of U.S. patent application Ser. No. 13/592,746, now U.S. Pat. No. 8,612,696, entitled EFFICIENT DATA STORAGE SYSTEM filed Aug. 23, 2012, which is incorporated herein by reference for all purposes, which is a continuation of U.S. patent application Ser. No. 12/819,356, now U.S. Pat. No. 8,275,955, entitled EFFICIENT DATA STORAGE SYSTEM filed Jun. 21, 2010, which is incorporated herein by reference for all purposes, which is a continuation of U.S. patent application Ser. No. 12/079,766, now U.S. Pat. No. 7,769,967, entitled EFFICIENT DATA STORAGE SYSTEM filed Mar. 28, 2008, which is incorporated herein by reference for all purposes, which is a divisional of U.S. patent application Ser. No. 11/136,263, now U.S. Pat. No. 7,373,464, entitled EFFICIENT DATA STORAGE SYSTEM filed May 24, 2005, which is incorporated herein by reference for all purposes, which is a continuation of U.S. patent application Ser. No. 10/325,690, now U.S. Pat. No. 6,928,526, entitled EFFICIENT DATA STORAGE SYSTEM, filed Dec. 20, 2002, which is incorporated herein by reference for all purposes.

FIELD OF THE INVENTION

The present invention relates generally to data storage systems. More specifically, a data storage system that efficiently eliminates redundancy is disclosed.

BACKGROUND OF THE INVENTION

Enterprises as well as individuals are becoming increasingly dependent on computers. As more and more data are generated, the need for efficient and reliable data backup storage systems is increasing. There are a variety of systems in existence today, utilizing both local and network storage for backup.

FIG. 1 is a block diagram illustrating a typical network backup system. Data are generated from a variety of sources, for instance data sources 100, 102 and 104. During the backup operation, the data sources stream their data contents to backup server 106. The backup server receives the data streams, optionally processes the data streams, and sends the data to backup devices such as tape 108 and data organizer 110. Data organizer 110 processes the data received and writes the data to a storage device 112, which can be a single disk or a disk array. The data organizer can be a device separate from the backup server or a part of the backup server.

During a backup operation, the data from the data sources are copied to the backup devices. Commonly, there is a substantial amount of data from each of the data sources that remains the same between two consecutive backups, and sometimes there are several copies of the same data. Thus, the system would be more efficient if unchanged data are not replicated.

There have been attempts to prevent redundant copying of data that stay the same between backups. One approach is to divide the data streams from the data sources into segments and store the segments in a hash table on disk. During subsequent backup operations, the data streams are again segmented and the segments are looked up in the hash table to determine whether a data segment was already stored previously. If an identical segment is found, the data segment is not stored again; otherwise, the new data segment is stored. Other alternative approaches including storing the segments in a binary tree and determining whether an incoming segment should be stored by searching in the binary tree.

While these approaches achieve some efficiency gains by not copying the same data twice, it incurs significant latency due to disk input/output (I/O) overhead as a result of constantly accessing the disk to search for the data segments. It would be desirable to have a backup system that could reduce the latency while eliminating unnecessary data replication.

BRIEF DESCRIPTION OF THE DRAWINGS

The present invention will be readily understood by the following detailed description in conjunction with the accompanying drawings, wherein like reference numerals designate like structural elements, and in which:

FIG. 6A-FIG. 6C illustrate the operations of a Bloom filter.

DETAILED DESCRIPTION

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

An improved storage system that eliminates redundant copying of identical data during a backup operation is disclosed. The system receives a segmented input data stream and produces segment ID's for the segments. Checks are performed on the data segments to determine whether the same segments have previously been stored to a segment database of the system, thereby avoiding redundant copying. Preliminary checking techniques are used to lower the latency associated with the checking and increase search efficiency. In one embodiment, metadata information about segments that are likely to be encountered soon are stored in a metadata cache and used in the preliminary check. In one embodiment, a summary is used in the preliminary check. In some embodiments, the cache and summary techniques are combined.

Figure 1:
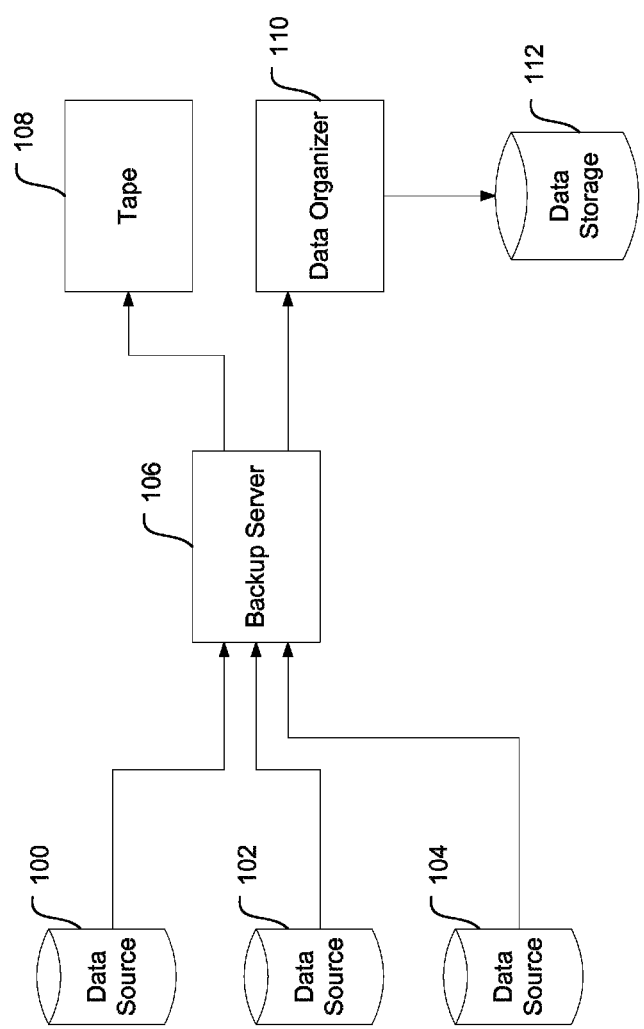
FIG. 1 is a block diagram illustrating a typical network backup system.
Figure 2:
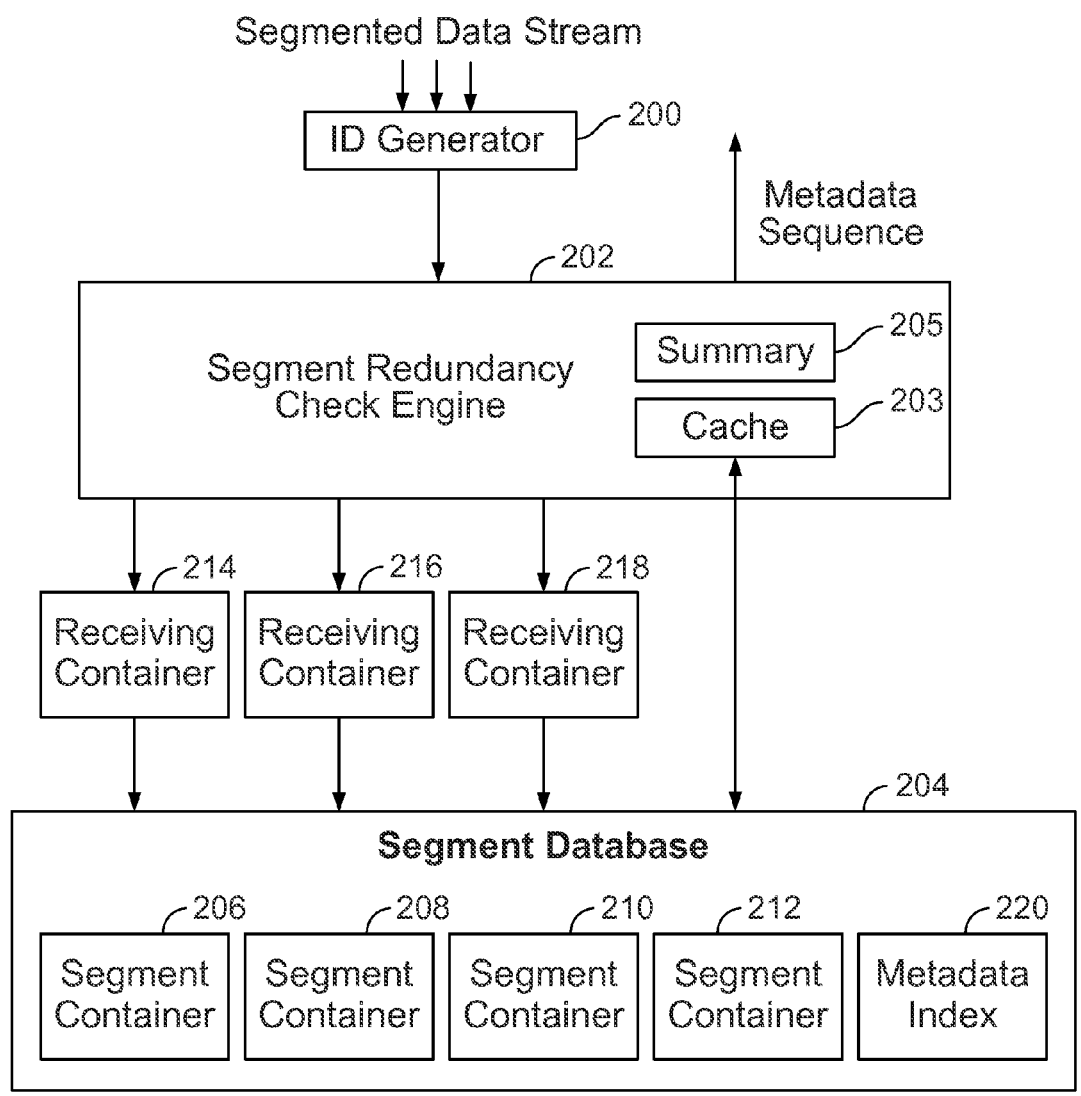
FIG. 2 is a block diagram illustrating a storage system embodiment according to the present invention.

FIG. 2 is a block diagram illustrating a storage system embodiment according to the present invention. One or more data streams from a backup server or other data source are divided into segments (also referred to as blocks), and the segmented data streams are received by an ID generator 200. The size of the segments varies depending on the implementation. In some embodiments, the segments have a fixed size. In some embodiments, the segments have variable sizes. In some embodiments, the data stream is broken into a number of parallel streams where the streams may have different segment sizes.

If the data stream is not segmented at the source of the data stream, then the stream may be separated into segments such that the segments can be readily matched with segments from previous or future streams according to the techniques disclosed in *Finding Similar Files in A Large File System* (Udi Manber, Technical Report TR 93-33, University of Arizona, October 1993.)

A segment ID is generated by ID generator 200 and assigned to each of the segments received. The location of the ID generator is implementation dependent. In the embodiment shown, the IDs are generated before the segments are sent to the segment redundancy check engine. In some embodiments, the IDs are generated sometime after the segments have been processed by the segment redundancy check engine. In certain embodiments, the IDs are generated when the segments are ready to be stored to segment database 204. The methods used to generate the ID are also implementation dependent. In some embodiments, the ID is the segment data itself. In some embodiments, a digital signature (also referred to as a cryptographic hash or a fingerprint), is generated from the result of a hash function computed using the segment data. In some embodiments, a cryptographic hash function such as the MD5 algorithm is used. In one embodiment, the ID is a Rabin fingerprint. In some embodiments, the ID is a sequential number assigned by the system.

In this embodiment, the segment data stream sent to segment redundancy check engine 202 includes both the segment data and the segment IDs. In other embodiments, the segment IDs are not sent to the segment redundancy check engine. The segment redundancy check engine is designed to efficiently determine whether segments are already stored by the system while reducing latency. The segment redundancy check engine reduces the amount of time required for most redundancy checks by performing certain preliminary checks to determine whether the segment has been stored previously, using operations that are carried out in quickly accessible memory.

Segment redundancy check engine 202 accesses a cache 203 that stores segment information for fast preliminary checks. In various embodiments, the segment information includes segment ID's, segment metadata, segment data, or combinations thereof. Cache 203 is typically implemented using memory that is quickly accessible, such as various kinds of dynamic random access memory, as well as various forms of non-volatile memory. Such memory or any other similarly quickly accessible memory is referred to as low latency memory. In general, low latency memory is any type of memory or cache that can generally be read more quickly or has better throughput than the large memory that stores the entire segment database. In the embodiment shown, the segment redundancy check engine also accesses a summary 205 that is implemented in memory, used to determine whether a segment has been stored previously.

If the preliminary checks do not conclusively determine whether the segment has already been stored, then a lookup is done in segment database 204 to confirm whether the segment has been stored previously. Segment database 204 is typically stored in a relatively high latency memory. A relatively high latency memory refers to various types of storage that cannot be addressed as quickly as the quickly accessible memory of the system, for example, hard disk, optical storage, devices over a network, etc. There are different causes for a storage to have high latency. For example, the storage has a small throughput due to the bus speed of its interface; or the storage is large in size and thus accessing specific items involves searching a large amount of data; or the storage is connected to the rest of the system via a network; or the storage is accessed often and a queue may develop or other problems may occur.

For the purpose of example, the segment databases in embodiments discussed in the rest of this specification are stored on hard disk, although it should be understood that other types of high latency memory can be used. Data segments and their associated metadata are stored in segment database 204. The segment database is content addressable, which is to say that given the content of a data segment, a lookup can be done in the segment database to confirm whether the segment has been stored previously. In the embodiment shown, segment database 204 includes a segment metadata index and multiple segment containers 206-212 that each stores multiple segments along with segment metadata. The segment metadata index provides a way to quickly look up the storage location of a segment. In different embodiments, the metadata index may be implemented as a hash table, a tree, a list, a combination thereof, etc. Only a small number of segment containers are illustrated for the purpose of example; an actual system would have a large number of such containers. In the embodiment shown, there are a number of receiving containers 214-218 that reside in memory and serve as buffers to store the newly received segments before they are written to segment containers on disk. Again, the number of receiving containers are different in different embodiments, although in many cases there is one receiving container per segment stream.

The containers are the basic storage units used in the segment database. A container is a relatively large chunk of data storage space (as much as 8 MB or more in some embodiments) used mainly to store data segments and segment metadata. In the embodiment shown, two types of containers, receiving and storage, are used. Each receiving container is used to store data segments and their metadata received from a single data source. Data segments from the same data source are added in the corresponding receiving container sequentially, and the metadata section of the receiving container is updated accordingly. The receiving containers are kept in memory so that new segments can be efficiently processed.

Figure 3:
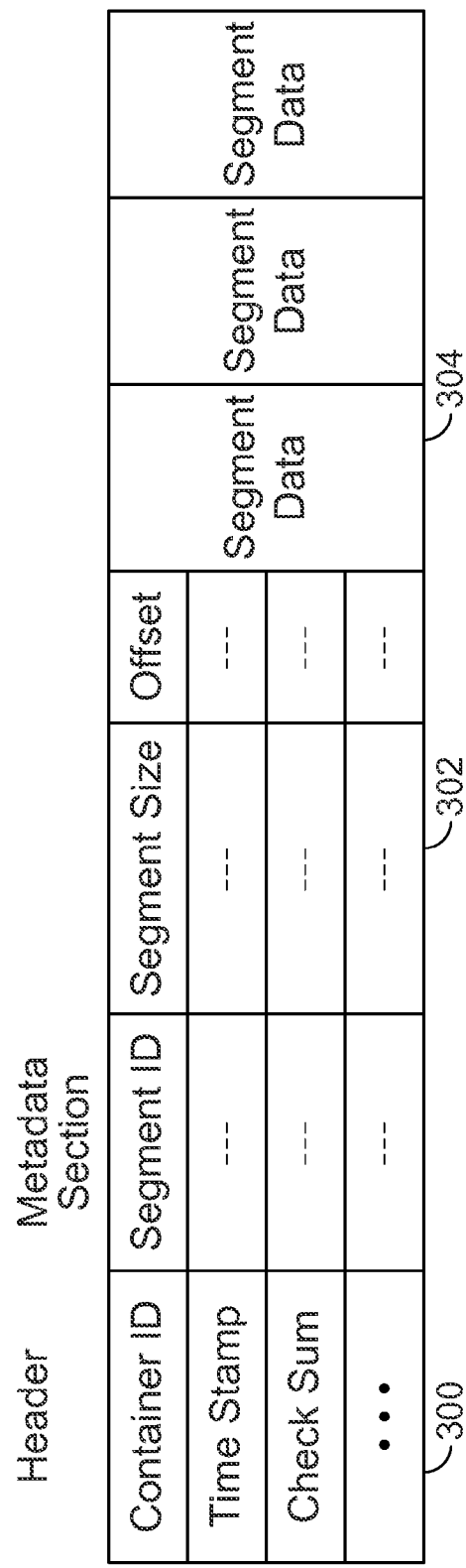
FIG. 3 illustrates the data layout of a container embodiment according to the present invention.

In this embodiment, once a receiving container is filled with data, it is written to disk as a whole. The storage units for containers on disk in the segment database are referred to as segment containers. A segment container may be read in its entirety, one section at a time, or in byte ranges within a section. The disk I/O performance is improved by using receiving containers to buffer data read from the stream and segment containers to write data to the segment database in large chunks. In certain embodiments, there is a container manager that is responsible for functions such as allocating, deleting, reading, writing and reliably storing the containers. The size of the containers are the same in the embodiment shown; they are different sizes in other embodiments. Generally, the receiving container and the segment container use the same data format. FIG. 3 illustrates the data layout of a container embodiment according to the present invention. 300 is the header portion of the container, which includes information related to the container such as container Id, time stamp, checksum, error correction codes, etc. 304 is the data section that stores the segment data. In some embodiments, the data segments are stored in compressed form. In one embodiment, a variation of Ziv-Lempel compression algorithm is used. In other embodiments, different compression techniques are applied to the data segments. 302 is the metadata section that stores the metadata associated with the corresponding segment data, such as the segment ID, segment size, and offset from the start of the container so that the segment can be accessed. In various embodiments, the metadata section may be implemented as an array, a list, a tree, a table, etc.

Returning to FIG. 2, metadata index 220 is used to confirm whether the data segment has already been stored. The metadata stored in the index is content dependent, in other words, the metadata are generated based on the content of a data segment and can be used to locate a data segment in the database if the data segment has been stored previously. In different embodiments, different types of metadata are used in the cache. In the embodiment shown, the metadata index is implemented as a hash table that is organized in buckets. The buckets store the segment ID's and other associated metadata, such as the ID of the container that stores the segment. To add new segment information, a hash function is applied to the segment ID to determine in which bucket the ID should be stored, and then the segment ID and its associated information is stored to the bucket. To look up a segment ID, the segment ID is hashed and the bucket corresponding to the hash value is located. A search is performed on all the segment ID's stored in the bucket to determine whether the segment ID already exists.

Typically, a storage system will store a very large number of segments and therefore a very large number of segment ID's are stored in the metadata index. Cache 203 stores only a small subset of the segment for fast preliminary determination of whether a received segment has already been stored. The segment redundancy check engine checks the complete metadata index stored on disk to confirm whether the data has been stored previously, if a segment cannot be found in cache 203 or if the result of the summary check is inconclusive.

The nature of the determination that is made from checking the cache and the summary should be noted. The cache can positively (that is, conclusively) determine that the segment is has previously been stored, because it is found in the cache. If the segment is not in the cache, then there is no positive determination that the segment is not in the larger high latency database that holds all the segments. The summary can positively determine that the segment has not been stored. However, if the summary includes the segment, that is not a positive determination that the segment has been stored, since other segments or combinations of other segments can cause false hits in the summary. So, after checking the cache and the summary, the result is one of three possibilities:

1. The summary positively determines that the segment is new.
2. The cache positively determines that the segment was previously stored.
3. Neither the summary nor the cache makes a positive determination.

If neither the summary nor the cache makes a positive determination, then the larger high latency database must be searched to make a positive determination.

Different types of segment information are stored in cache 203 in various embodiments, including segment ID's, segment data, segment metadata, or combinations thereof. In some embodiments, the segment containers are cached and used in the preliminary check. In some embodiments, the metadata information of the segments are cached, and the preliminary checking is performed using the metadata information. For instance, the metadata information may include a short ID assigned to a data segment and a signature of the data segment, where the short ID is not likely to be unique. The preliminary check then involves looking up the short ID, and then the signature of a segment in the cache to determine whether the segment has been stored previously. Embodiments using segment ID in the cache are discussed for the purpose of example hereafter; it should be noted that other types of segment information can be used in the cache as well. The metadata are organized in the cache to allow for fast lookups. In various embodiments, the metadata may be stored in a hash table, a tree, a binary tree, a list, etc.

Accessing the segment metadata index on the hard disk is relatively expensive in terms of time. For that reason, it is important that the segment ID's of the segments most likely to be encountered in the data stream are in the cache and that space in the cache is not wasted on segment ID's that are not likely to be encountered.

In the embodiment shown, the groups of segment ID's that are transferred to and from the cache correspond to the groups of segments that are stored in segment containers. In other embodiments, segment ID's may be grouped independently of how the segments themselves are stored. To decrease the likelihood of cache misses, segment ID's are preferably grouped in some manner wherein when one segment ID in the group of segment ID's is encountered in the incoming data stream, other segment ID's in the group of segment ID's are likely to be encountered soon.

An important consideration in increasing the likelihood of cache hits is that the segments corresponding to each group of segment ID's be related, that is, that they generally are received closely together. In many systems, the incoming data stream may include segments from a number of sources that are interleaved. Data from a single source is likely to be related, but consecutive segments in an interleaved stream are not necessarily interleaved in the same manner if their respective sources are independent. In one embodiment, the sources provide stream with identifiers that are used to separate the interleaved stream into substreams corresponding to segments from a single source. Segments from each substream are stored in a different receiving container so that related segments are stored in the same place. In addition, the segment ID's for each receiving container are therefore related and comprise a useful group to be transferred to and from the cache together. Again it should be noted that the segment ID groups described in this example correspond to groups of segments stored in a container but in other embodiments, groups of segment ID's may be defined without any correspondence to how segments themselves are stored. Additionally, other related groups of segment information may be used instead of segment ID's.

In this embodiment, when the cache is full, the group of segment ID's that is the least recently used group of container segment ID's is dropped from the cache to make room for a new group of segment ID's from a newly accessed container. The next time segment ID's that are the same as the ones from the container that includes the dropped group of segment ID's are encountered in the data stream, the segment redundancy check engine will not find the segment ID's in the cache, and will then check the metadata index for the information. In some embodiments, the segment ID's can be dropped individually from the cache as opposed to being dropped in a group. In some embodiments, the cached segment ID's are stored in a first in first out (FIFO) queue, and the dropped segments are the segments that are stored to the queue the earliest.

In the embodiment shown, accessing segment ID's from a segment container will prompt the system to transfer all of the segment ID's from that container to the cache, and the least recently used group of segment ID's will be dropped from the cache. In some embodiments, one or more segment ID's are dropped from the cache and the ID's are not grouped. The segment ID's in the updated cache are more likely to be related to the segment ID's of the incoming data stream, therefore cache hits are more likely and the I/O overhead associated with checking the metadata index is reduced. The system maintains a least recently used list that tracks when a segment ID's group was accessed. The list is used to replace the data that has not been accessed for the longest time with newly accessed data.

In some embodiments, the output of the segment redundancy check engine is a sequence of ID's that is stored and used later for reconstructing the data stream when the system performs a read operation. In various embodiments, the sequence of ID's may be segment ID's, a set of sequential numbers assigned to the data segments, or other types of segment metadata. The sequence of ID's can be used in combination with the segments stored in the segment containers to recreate the data stream. Thus, the ID sequence is a highly compressed representation of the incoming data stream that can be uncompressed by retrieving each of the segments in the segment database that are identified by the ID's. There are different ways to retrieve the segments using the ID sequence, such as using the ID information to look up the segments in the metadata cache, or finding the segment metadata in the metadata index and using the segment container and information in the metadata index to locate the segment itself.

Figure 4A:
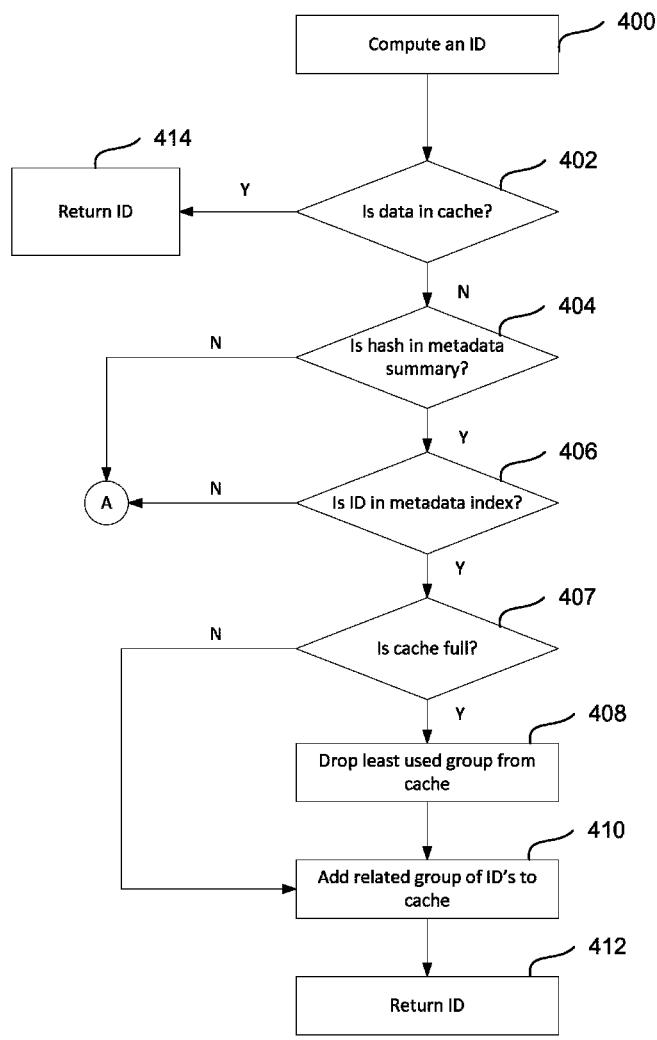
FIG. 4A and FIG. 4B are flowcharts illustrating the handling of an incoming segment in a storage system embodiment in accordance with the present invention.
Figure 4B:
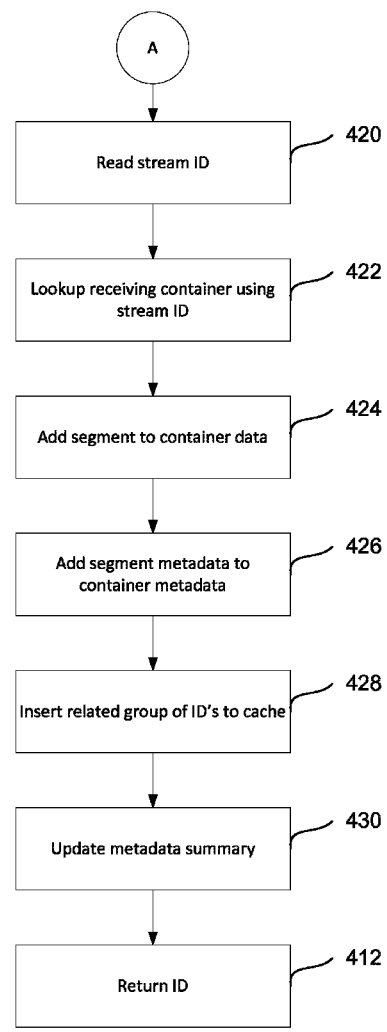

FIG. 4A and FIG. 4B are flowcharts illustrating the handling of an incoming segment in a storage system embodiment in accordance with the present invention. In this embodiment, the segment ID's are stored in the cache. Thus, a segment ID is looked up in the cache to determine whether the segment has been stored previously. It should be noted that in other embodiments, other types of segment information can be stored in the cache for lookups instead of the segment ID's. At the beginning, a segment ID is generated for a data segment (400). In other embodiments, this step may be implemented elsewhere in the flowchart or omitted entirely. The segment redundancy check engine then performs a first preliminary check to determine whether the segment has been stored by looking up the segment ID in the engine's cache (402). This step should eliminate a good portion of data segments that are repeated. The cache stores the groups of selected segment information in memory, allowing for fast lookups of segment information as well as fast read operations.

If the segment ID is found in the metadata cache, the segment ID is returned to the segment redundancy check engine, and the segment is discarded (414). If, however, the segment ID is not found in the metadata cache, the segment redundancy check engine proceeds to perform a second preliminary check using a summary (404). A summary is a space efficient, probabilistic way of summarizing the segment database. It is designed to use a small amount of memory to summarize which segments are in the segment database. The details of the summary operations are described later in FIG. 6. In this embodiment, a hash of the segment information is used to determine whether the segment is in the summary.

In this embodiment, when the hash is not found in the summary, it means that the segment does not exist in the segment database, the segment is new and control is transferred to point A in FIG. 4B. On the other hand, if the hash is found in the summary, it does not necessarily mean that the segment data exists in the segment database. In other words, the summary accurately determines when the segment does not exist in the segment database and does not give false negatives; however, it may give false positives with some small probability. Thus, further action should be taken to ascertain whether the segment indeed exists in the segment database. In this embodiment, a confirmation step is used to positively determine whether the segment exists in the database. In the embodiment shown, looking up the segment ID in the metadata index confirms whether the ID and its corresponding data segment have already been stored (406).

If the ID is found in the metadata index, the cache is updated by reading a group of related metadata or segment data into the cache. If the cache is full (407), then the least recently used ID's or group of ID's are dropped from the cache (408). If the cache is not full, then control is transferred to (410). A related group of ID's are then added to the cache (410). The segment ID is returned to the segment redundancy check engine (412) and the segment data are discarded.

If the hash is not found in the summary, or if the ID is not found in the metadata index, then the data segment and the ID are new and various data structures in the system should be updated to reflect the addition of the new data. Control is transferred to point A in FIG. 4B. A stream ID is extracted from the incoming data (FIG. 4B, 420), and the receiving container corresponding to the stream is located using the stream ID (422). The segment is then added to the receiving container (424). The segment metadata are added to the container's metadata section (426), and the group of related segment ID's are added to the cache if needed (428). The summary is also updated accordingly (430). The segment ID is returned to the segment redundancy check engine to be added to the segment ID sequence (412).

The preliminary checking steps provide ways to more efficiently determine whether a data segment has been stored previously. The checking in metadata cache and the checking in summary can be independent of each other. In some embodiments, step 404 occurs prior to step 402. In certain embodiments, one of the two preliminary checking steps is implemented.

Figure 5:
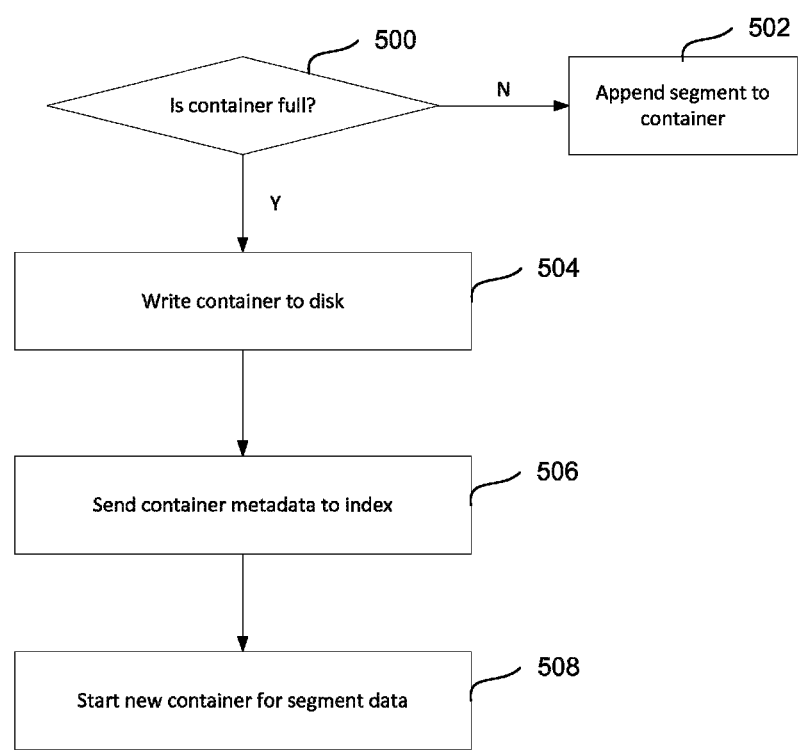
FIG. 5 is a flowchart illustrating the details of adding a new segment to the receiving container step shown in FIG. 4B.

FIG. 5 is a flowchart illustrating the details of adding a new segment to the receiving container step (FIG. 4B 424). First, is determined whether the receiving container is full (500). If it is not full, the segment is appended to the container's data section (502). If it is full, the receiving container is written to disk (504) and its metadata are added to the metadata index (506). A new receiving container is then created to receive future segment data (508). The in-memory receiving container buffers the segment data and reduces the I/O overhead.

The summary used in FIG. 4A step 404 is a space efficient, probabilistic summary of the database designed to use minimal amount of memory to summarize the data segments in the database. In one embodiment, the summary is generated from the segment ID's. In other embodiments, the summary is generated using the segment data. In certain embodiments, the summary is generated from other metadata associated with the segment.

In one embodiment, the summary is implemented using a summary vector. One example of such a summary vector is a "Bloom filter." FIG. 6A-FIG. 6C illustrate the operations of a Bloom filter. A Bloom filter uses a summary vector of m bits to summarize the information about n data items. The summary vector is updated when a new data item is received.

Initially, all the bits in the summary vector are set to 0, as shown in FIG. 6A. A set of k independent hash functions h1, h2, . . . hk are applied to the segment. Different parameters of the segment can be used by the hash in different embodiments, including the data segment itself, parts of the data segment, metadata of the data segment, etc. In this embodiment, a segment ID, a, is used; and the results are $h1(a)=p1$, $h2(a)=p2$, . . . $hk(a)=pk$, where p1–pk are numbers within a range between 1 to m. In the embodiment shown, k equals 3.

The bits at positions p1, p2, . . . pk are then set to 1 in the summary vector as shown in FIG. 6B, as a is added to the metadata index. Other inputs are hashed and the bits in the summary vector are set in a similar fashion. For instance, the hash functions are applied to a different ID, b, to obtain results $h1(b)=p'1$, $h2(b)=p'2$, . . . $hk(b)=p'k$. The bits at positions p'1, p'2, . . . p'k are set to 1 in the summary vector as shown in FIG. 6C. To determine whether an input ID x has already been added to the metadata index, first the hash functions are applied to x to obtain a new set of results $h1(x)=q1$, $h2(x)=q2$, . . . $hk(x)=qk$. Then, the bit positions in the summary vector that correspond to q1, q2, . . . qk are checked. If any of the bit positions is 0, then it is positively determined that x has never been updated in the summary vector and is not in the metadata index. If, however, all the bit positions are 1 as shown in FIG. 6C, it only indicates that x may already be in the database since the bit positions may have been set to 1 by a combination of two or more other IDs. Thus, further checking is needed to confirm whether the ID has indeed been stored previously. In some embodiments, the confirmation is performed by looking up the ID in the metadata index.

There are many applicable hash functions used in different embodiments, and the number of hash function used is implementation dependent. For example, the data bits of the ID can be divided into chunks and the results of the hash functions are the individual chunks. In one embodiment, a 160 bit long ID is divided into five chunks of 32 bits each by a set of 5 hash functions. In some embodiments, a group of $\log_2 m$ bits are selected from a single large hash. An improved system and method have been disclosed for efficiently storing data. The system receives a segmented input data stream and produces segment ID's. The system performs checks based on segment ID's to determine whether the same segments have previously been stored, thereby avoiding redundant copying. Preliminary checking techniques including caching and summary are used to efficiently determine the redundancy and minimize the latency associated with the checking. Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A system for storing data comprising:
an interface to receive a data stream comprising a plurality of data segments; and
a processor to:
determine whether one data segment of the plurality of data segments has been stored previously in a low latency memory;
in the event that the one data segment is determined to have been stored previously, confirm whether the one data segment has been stored;
in the event that the one data segment is determined to have not been stored previously in the low latency memory or in the event that the one data segment is confirmed to not have been stored, store the one data segment, wherein storing the one data segment comprises storing the one data segment in a segment database, wherein the segment database includes a metadata index, and wherein storing the one data segment comprises storing metadata for the one data segment in the metadata index.

2. A system as in claim 1, wherein in the event that the one data segment is confirmed to have been stored previously as a previously stored one data segment, store an identifier for the previously stored one data segment.

3. A system as in claim 2, wherein the identifier is derived from the content of the previously stored one data segment.

4. A system as in claim 2, wherein the identifier is not derived from the content of the previously stored one data segment.

5. A system as in claim 2, wherein the identifier is used to reconstruct the data stream.

6. A system as in claim 1, wherein the processor is to generate segment information for the one data segment.

7. A system as in claim 6, wherein the segment information includes a digital signature.

8. A system as in claim 7, wherein the digital signature is a result of a hash function.

9. A system as in claim 7, wherein the digital signature is a Rabin fingerprint.

10. A method for storing data comprising:
receiving a data stream comprising a plurality of data segments;
determining, using a processor, whether one data segment of the plurality of data segments has been stored previously in a low latency memory;
in the event that the one data segment is determined to have been stored previously, confirming whether the one data segment has been stored;
in the event that the one data segment is determined to have not been stored previously in the low latency memory or in the event that the one data segment is confirmed to not have been stored, storing the one data segment, wherein storing the one data segment comprises storing the one data segment in a segment database, wherein the segment database includes a metadata index, and wherein storing the one data segment comprises storing metadata for the one data segment in the metadata index.

11. A method as in claim 10, further comprising in the event that the one data segment is confirmed to have been stored previously as a previously stored one data segment, storing an identifier for the previously stored one data segment.

12. A method as in claim 11, wherein the identifier is derived from the content of the previously stored one data segment.

13. A method as in claim 11, wherein the identifier is not derived from the content of the previously stored one data segment.

14. A method as in claim 11, wherein the identifier is used to reconstruct the data stream.

15. A method as in claim 10, further comprising generating segment information for the one data segment.

16. A method as in claim 15, wherein the segment information includes a digital signature.

17. A computer program product for storing data, the computer program product being embodied in a non-transitory computer readable storage medium and comprising computer instructions for:
   receiving a data stream comprising a plurality of data segments;
   determining, using a processor, whether one data segment of the plurality of data segments has been stored previously in a low latency memory;
   in the event that the one data segment is determined to have been stored previously, confirming whether the one data segment has been stored;
   in the event that the one data segment is determined to have not been stored previously in the low latency memory or in the event that the one data segment is confirmed to not have been stored, storing the one data segment, wherein storing the one data segment comprises storing the one data segment in a segment database, wherein the segment database includes a metadata index, and wherein storing the one data segment comprises storing metadata for the one data segment in the metadata index.

* * * * *